United States Patent
Kanamura (10) Patent No.: US 11,958,317 B2
(45) Date of Patent: Apr. 16, 2024

(54) PNEUMATIC TIRE

(71) Applicant: Toyo Tire Corporation, Itami (JP)

(72) Inventor: Toshihiko Kanamura, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 407 days.

(21) Appl. No.: 17/386,816

(22) Filed: Jul. 28, 2021

(65) Prior Publication Data

US 2022/0048332 A1 Feb. 17, 2022

(30) Foreign Application Priority Data

Aug. 17, 2020 (JP) ................. 2020-137607

(51) Int. Cl.
*B60C 11/12* (2006.01)
*B60C 11/03* (2006.01)

(52) U.S. Cl.
CPC ...... *B60C 11/0304* (2013.01); *B60C 11/1204* (2013.01); *B60C 11/1236* (2013.01); *B60C 11/1259* (2013.01); *B60C 11/1281* (2013.01); *B60C 2011/0348* (2013.01); *B60C 2011/0351* (2013.01); *B60C 2011/0381* (2013.01)

(58) Field of Classification Search
CPC ................. B60C 11/01; B60C 11/032; B60C 2011/0381; B60C 2011/0348
See application file for complete search history.

(56) References Cited

U.S. PATENT DOCUMENTS

| 2008/0173380 A1* | 7/2008 | Ohara ............... B60C 11/01 |
| | | 152/209.16 |
| 2019/0160883 A1* | 5/2019 | Nakamura ...... B60C 11/1353 |

FOREIGN PATENT DOCUMENTS

| JP | 02241804 A | * | 9/1990 | ...... B60C 11/1263 |
| JP | 05262105 A | * | 10/1993 | |
| JP | 2000233606 A | * | 8/2000 | |
| JP | 2002019422 A | * | 1/2002 | |
| JP | 2008207610 A | * | 9/2008 | |
| JP | 2008308131 A | * | 12/2008 | ...... B60C 11/0306 |
| JP | 2010-247708 A | | 11/2010 | |

OTHER PUBLICATIONS

English machine translation of JP-2008207610-A. (Year: 2008).*
English machine translation of JP-2008308131-A (Year: 2008).*
English machine translation of JP-2002019422-A. (Year: 2002).*
English machine translation of JP-2000233606-A (Year: 2000).*

* cited by examiner

*Primary Examiner* — Robert C Dye
(74) *Attorney, Agent, or Firm* — WHDA, LLP (57) ABSTRACT

In a pneumatic tire, a plurality of lands include a first land, the first land comprises a plurality of circumferential grooves that extend in a tire circumferential direction and that are arrayed in a tire axial direction, the plurality of circumferential grooves are respectively arranged at portions in the tire circumferential direction of the first land, the plurality of circumferential grooves include a first circumferential groove which is arranged in inwardmost fashion in the tire axial direction, and a second circumferential groove which is arranged in outwardmost fashion in the tire axial direction, and as viewed in a tire meridional section, an inner space area of the first circumferential groove is greater than an inner space area of the second circumferential groove.

20 Claims, 5 Drawing Sheets

PNEUMATIC TIRE

CROSS REFERENCE TO RELATED APPLICATIONS

This application claims the benefit of priority of Japanese application no. 2020-137607, filed on Aug. 17, 2020, which is incorporated herein by reference.

BACKGROUND OF THE INVENTION

Field of the Invention

The present disclosure relates to a pneumatic tire.

Description of the Related Art

Conventionally the tread of a pneumatic tire might, for example, comprise a plurality of main grooves extending in the tire circumferential direction, and a plurality of lands which are partitioned by the main grooves. In addition, a land might comprise a plurality of circumferential grooves that extend in the tire circumferential direction, the plurality of circumferential grooves being arrayed in the tire axial direction (e.g., JP 2010-247708 A).

In accordance with such a pneumatic tire, during a turn on a snowy road surface, action of the edges of the circumferential grooves permits improvement in performance with respect to stability in handling during turns on snowy road surfaces. It so happens in recent times that there has been demand for pneumatic tires that are capable of being used in all seasons, as a result of which it has become necessary to ensure ability to deliver performance with respect to stability in handling during turns not just on snowy road surfaces but also on dry road surfaces.

SUMMARY OF THE INVENTION

It is therefore an object of the present disclosure to provide a pneumatic tire that will make it possible to simultaneously achieve performance with respect to stability in handling during turns on dry road surfaces and performance with respect to stability in handling during turns on snowy road surfaces.

There is provided a pneumatic tire comprises a tread having a tread surface that comes in contact with a ground; wherein the tread comprises a plurality of main grooves extending along a full circumference in a tire circumferential direction, and a plurality of lands partitioned by the main grooves;
the plurality of lands include a first land;
the first land comprises a plurality of circumferential grooves that extend in the tire circumferential direction and that are arrayed in a tire axial direction;
the plurality of circumferential grooves are respectively arranged at portions in the tire circumferential direction of the first land;
the plurality of circumferential grooves include a first circumferential groove which is arranged in inwardmost fashion in the tire axial direction, and a second circumferential groove which is arranged in outwardmost fashion in the tire axial direction; and
as viewed in a tire meridional section, an inner space area of the first circumferential groove is greater than an inner space area of the second circumferential groove.

DETAILED DESCRIPTION OF THE INVENTION

Below, an embodiment of a pneumatic tire is described with reference to FIG. 1 through FIG. 4. At the respective drawings (and the same is true for FIG. 5), note that dimensional ratios at the drawings and actual dimensional ratios are not necessarily consistent, and note further that dimensional ratios are not necessarily consistent from drawing to drawing.

At the respective drawings, first direction D1 is the tire axial direction D1 which is parallel to the tire rotational axis which is the center of rotation of pneumatic tire (hereinafter also referred to as simply "tire") 1, second direction D2 is the tire radial direction D2 which is the direction of the diameter of tire 1, and third direction D3 is the tire circumferential direction D3 which is circumferential with respect to the rotational axis of the tire.

Toward the interior in the tire axial direction D1 means nearer to tire equatorial plane S1, and toward the exterior in the tire axial direction D1 means farther away from tire equatorial plane S1. Note that the tire axial direction D1 may be further subdivided into first side D11, which is also referred to as first axial direction side D11; and second side D12, which is also referred to as second axial direction side D12. Furthermore, the side toward the interior in the tire radial direction D2 is the side which is nearer to the tire rotational axis, and the side toward the exterior in the tire radial direction D2 is the side which is farther away from the tire rotational axis. Further, the tire circumferential direction D3 may be further subdivided into first side D31, which is also referred to as first circumferential direction side D31; and second side D32, which is also referred to as second circumferential direction side D32.

Tire equatorial plane S1 refers to a plane that is located centrally in the tire axial direction D1 of tire 1 and that is perpendicular to the rotational axis of the tire; tire meridional planes refer to planes that are perpendicular to tire equatorial plane S1 and that contain the rotational axis of the tire. Furthermore, the tire equator is the line formed by the intersection of tire equatorial plane S1 and the outer surface (tread surface 2a, described below) in the tire radial direction D2 of tire 1.

Figure 1:
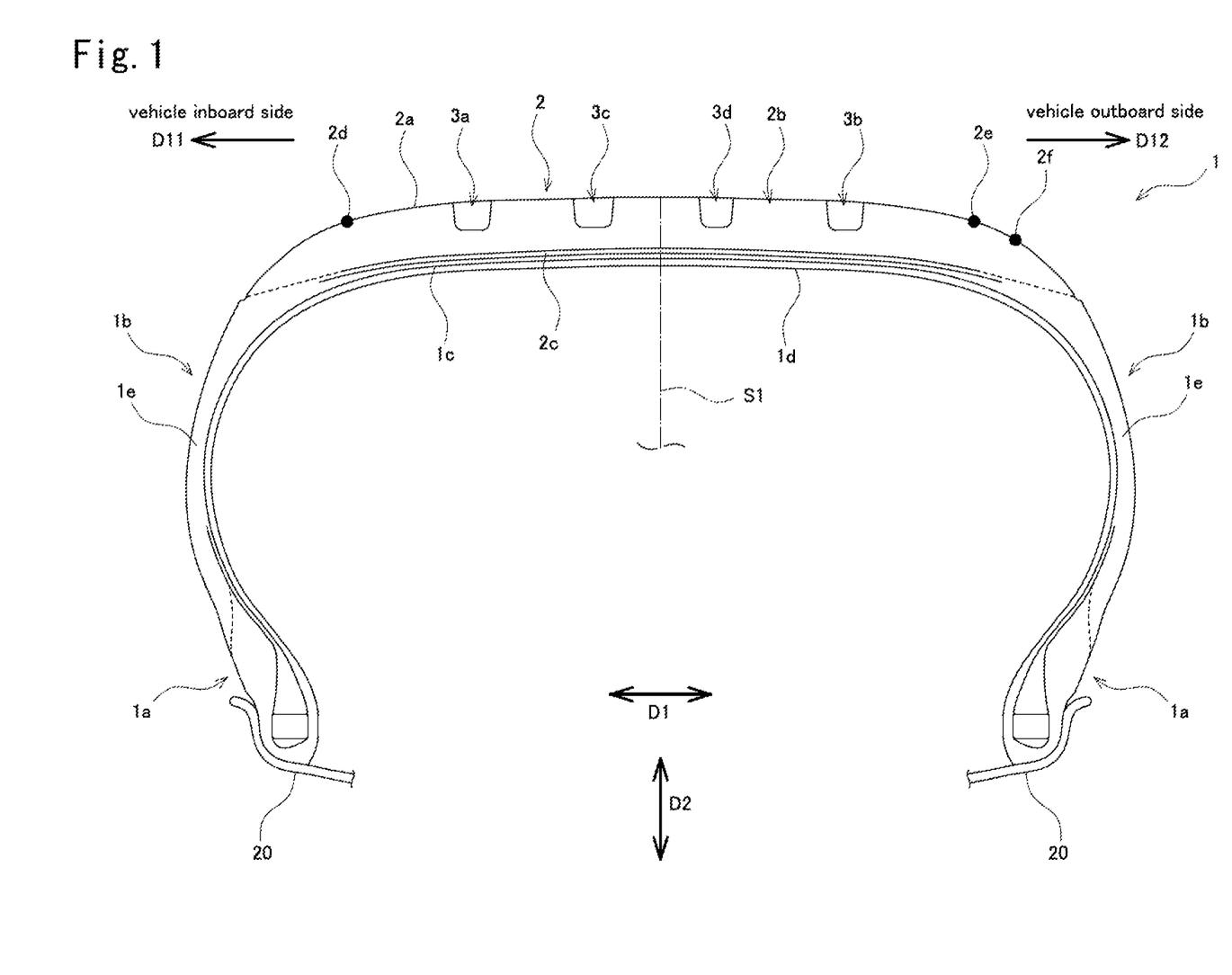
FIG. 1 is a view of a section, taken along a tire meridional plane, of the principal components in a pneumatic tire associated with an embodiment.

As shown in FIG. 1, tire 1 associated with the present embodiment comprises a pair of bead regions 1a at which bead cores are present; sidewalls 1b which extend outwardly in the tire radial direction D2 from the respective bead regions 1a; and tread 2, the exterior surface in the tire radial direction D2 of which contacts the road surface and which is contiguous with the outer ends in the tire radial direction D2 of the pair of sidewalls 1b. In accordance with the present embodiment, tire 1 is a pneumatic tire 1, the interior of which is capable of being filled with air, and which is capable of being mounted on a rim 20.

Furthermore, tire 1 comprises carcass 1c which spans the pair of bead cores, and inner liner 1d which is arranged at a location toward the interior from carcass 1c and which has superior functionality in terms of its ability to impede passage of gas therethrough so as to permit air pressure to be maintained. Carcass 1c and inner liner 1d are arranged in parallel fashion with respect to the inner circumference of the tire over a portion thereof that encompasses bead regions 1a, sidewalls 1b, and tread 2.

Tire 1 has a structure that is asymmetric with respect to tire equatorial plane S1. In accordance with the present embodiment, tire 1 is a tire for which a vehicle mounting direction is indicated, which is to say that there is an indication of whether the left or the right side of the tire should be made to face the vehicle when tire 1 mounted on rim 20. Moreover, the tread pattern formed at tread surface 2a of tread 2 is shaped in asymmetric fashion with respect to tire equatorial plane S1.

The orientation in which the tire is to be mounted on the vehicle is indicated at sidewall 1b. More specifically, sidewall 1b is provided with sidewall rubber 1e which is arranged toward the exterior in the tire axial direction D1 from carcass 1c so as to constitute the tire exterior surface, said sidewall rubber 1e having at the surface thereof an indicator region (not shown) that indicates an orientation in which the tire is to be mounted on the vehicle.

For example, one sidewall 1b, i.e., that which is to be arranged toward the interior when the tire is mounted on the vehicle (hereinafter also referred to as the "inboard side"), might be marked (e.g., with the word "INSIDE" or the like) so as to contain an indication to the effect that it is for the inboard side. Furthermore, for example, the other sidewall 1b, i.e., that which is to be arranged toward the exterior when the tire is mounted on the vehicle (hereinafter also referred to as the "outboard side"), might be marked (e.g., with the word "OUTSIDE" or the like) so as to contain an indication to the effect that it is for the outboard side. In accordance with the present embodiment, first axial direction side D11 is taken to be the vehicle inboard side, and second axial direction side D12 is taken to be the vehicle outboard side.

Tread 2 is provided with tread rubber 2b having tread surface 2a which contacts the road surface, and belt 2c which is arranged between tread rubber 2b and carcass 1c. In addition, present at tread surface 2a is the contact patch that actually comes in contact with the road surface, and the portions within said contact patch that are present at the outer ends in the tire axial direction D1 are referred to as contact patch ends 2d, 2e. Note that said contact patch refers to the tread surface 2a that comes in contact with the road surface when a normal load is applied to a tire 1 mounted on a normal rim 20 when the tire 1 is inflated to normal internal pressure and is placed in vertical orientation on a flat road surface.

Normal rim 20 is that particular rim 20 which is specified for use with a particular tire 1 in the context of the body of standards that contains the standard that applies to the tire 1 in question, this being referred to, for example, as a standard rim in the case of JATMA, a design rim in the case of TRA, or a measuring rim in the case of ETRTO.

Normal internal pressure is that air pressure which is specified for use with a particular tire 1 in the context of the body of standards that contains the standard that applies to the tire 1 in question, this being "maximum air pressure" in the case of JATMA, the maximum value listed at the table entitled "Tire Load Limits at Various Cold Inflation Pressures" in the case of TRA, or "inflation pressure" in the case of ETRTO, which when tire 1 is to be used on a passenger vehicle is taken to be an internal pressure of 180 kPa.

Normal load is that load which is specified for use with a particular tire 1 in the context of the body of standards that contains the standard that applies to the tire 1 in question, this being "maximum load capacity" in the case of JATMA, the maximum value listed at the aforementioned table in the case of TRA, or "load capacity" in the case of ETRTO, which when tire 1 is to be used on a passenger vehicle is taken to be 85% of the load corresponding to an internal pressure of 180 kPa.

Figure 2:
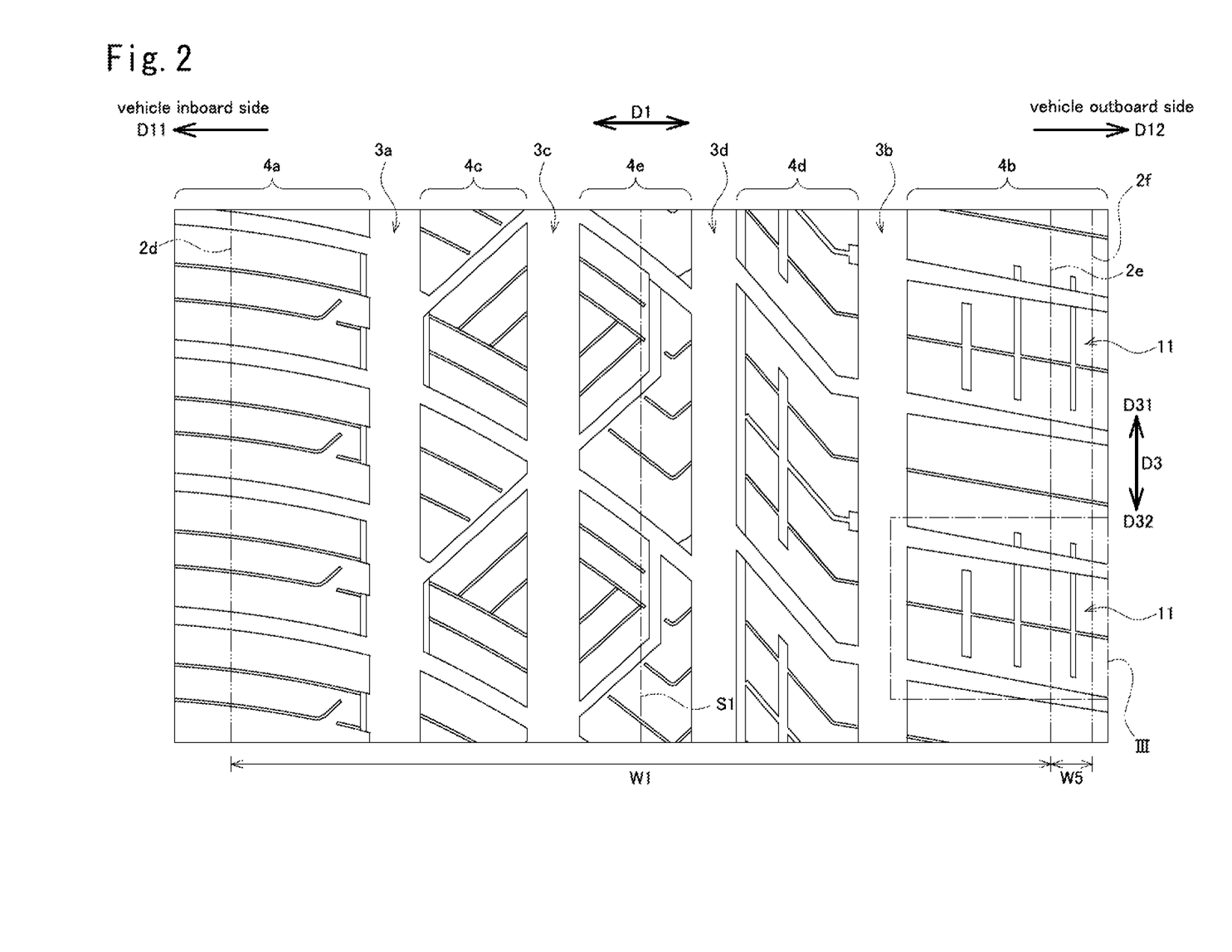
FIG. 2 is a drawing showing the principal components at the tread surface of a pneumatic tire associated with same embodiment as they would exist if unwrapped so as to lie in a single plane.

As shown in FIG. 1 and FIG. 2, tread rubber 2b comprises a plurality of main grooves 3a through 3d that extend in the tire circumferential direction D3. Main grooves 3a through 3d extend continuously in the tire circumferential direction D3. Note that whereas main grooves 3a through 3d extend in straight fashion in the tire circumferential direction D3 in the present embodiment, there is no limitation with respect to such constitution, it also being possible to adopt a constitution in which at least one main groove is repeatedly bent such that it extends in zigzag fashion, or a constitution in which this is, for example, repeatedly curved such that it extends in wavy fashion.

Main grooves 3a through 3d might, for example, be provided with so-called tread wear indicators (not shown) which are portions at which depth of the groove is reduced so as to make it possible to ascertain the extent to which wear has occurred as a result of the exposure thereof that takes place in accompaniment to wear. Furthermore, main grooves 3a through 3d might, for example, have groove widths that are each not less than 3% of the distance W1 (dimension in the tire axial direction D1) between contact patch ends 2d, 2e. Furthermore, main grooves 3a through 3d might, for example, each have a groove width that is not less than 5 mm.

The pair of main grooves 3a, 3b arranged at outermost locations in the tire axial direction D1 are referred to as shoulder main grooves 3a, 3b, and the main grooves 3c, 3d arranged between the pair of shoulder main grooves 3a, 3b are referred to as center main grooves 3c, 3d. Moreover, while there is no particular limitation with respect to the number of main grooves 3a through 3d, the number that are present in the present embodiment is four.

Of the shoulder main grooves 3a, 3b, that main groove 3a which is arranged toward the first axial direction side (the vehicle inboard side) D11 is referred to as first shoulder main groove 3a, and that main groove 3b which is arranged toward the second axial direction side (the vehicle outboard side) D12 is referred to as second shoulder main groove 3b. Furthermore, among the center main grooves 3c, 3d, that main groove 3c which is arranged toward the first axial direction side (the vehicle inboard side) D11 is referred to as first center main groove 3c, and that main groove 3d which is arranged toward the second axial direction side (the vehicle outboard side) D12 is referred to as second center main groove 3d.

Tread rubber 2b comprises a plurality of lands 4a through 4e which are partitioned by the plurality of main grooves 3a through 3d. Moreover, while there is no particular limitation with respect to the number of lands 4a through 4e, the number that are present in the present embodiment is five.

Lands 4a, 4b which are partitioned by shoulder main groove(s) 3a, 3b are referred to as shoulder lands 4a, 4b, and lands 4c through 4e which are partitioned by pair(s) of adjacent main grooves 3a through 3d are referred to as middle lands 4c through 4e. Note that lands 4c, 4d which are partitioned by center main groove(s) 3c, 3d and shoulder main groove(s) 3a, 3b are also referred to as quarter lands (also referred to as "mediate" lands) 4c, 4d, and land 4e which is partitioned by the pair of center main grooves 3c, 3d is also referred to as center land 4e.

Among the shoulder lands 4a, 4b, that land 4a which is arranged toward the first axial direction side (the vehicle inboard side) D11 is referred to as first shoulder land 4a, and that land 4b which is arranged toward the second axial direction side (the vehicle outboard side) D12 is referred to as second shoulder land 4b. Furthermore, among the quarter lands 4c, 4d, that land 4c which is arranged toward the first axial direction side (the vehicle inboard side) D11 is referred to as first quarter land 4c, and that land 4d which is arranged toward the second axial direction side (the vehicle outboard side) D12 is referred to as second quarter land 4d.

The constitution of second shoulder land 4b will now be described with reference to FIG. 3 and FIG. 4.

Figure 3:
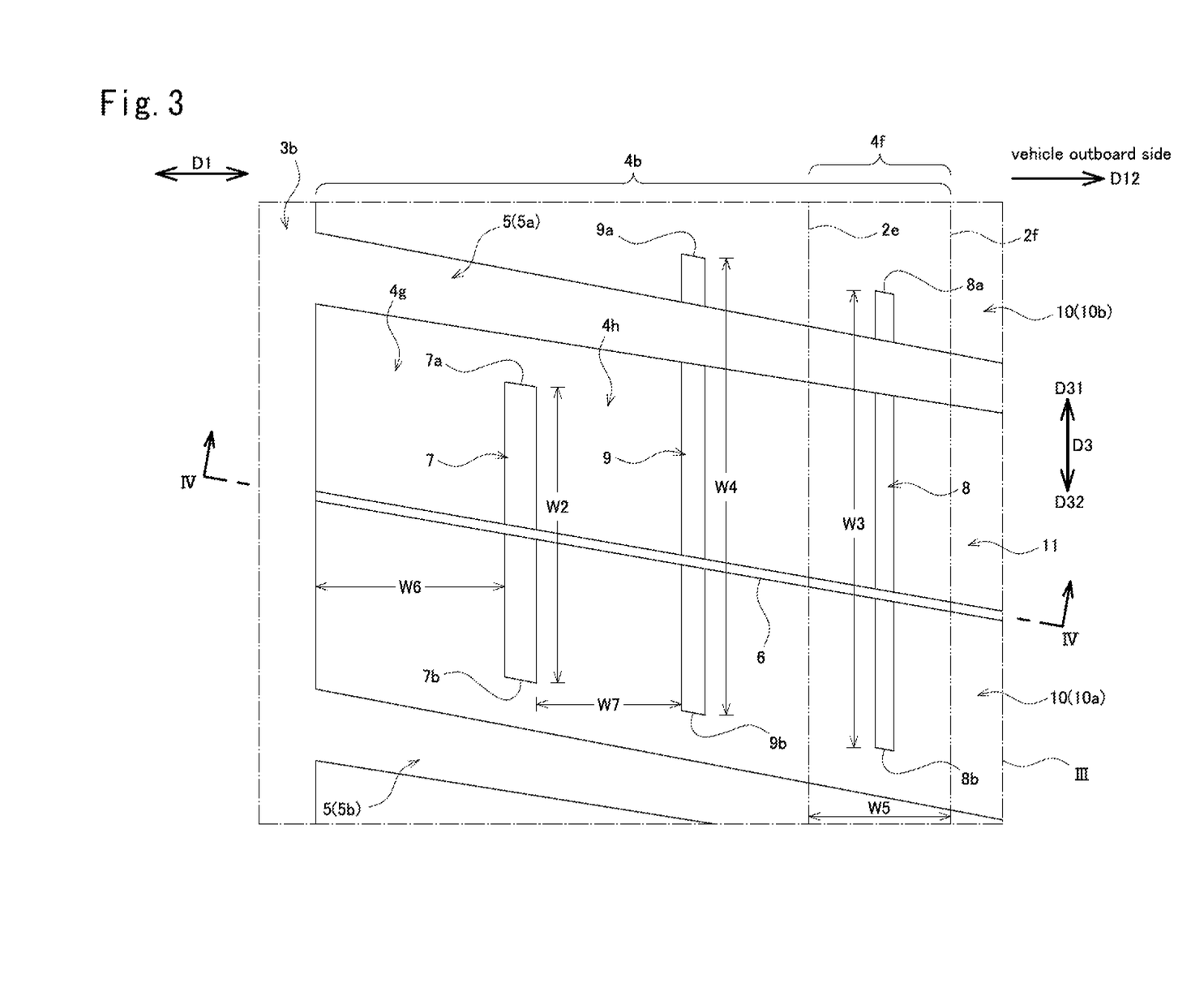
FIG. 3 is an enlarged view of region III in FIG. 2.

As shown in FIG. 3, second shoulder land 4b comprises a plurality of ancillary grooves 5 through 9. Among ancillary grooves 5 through 9, note that those ancillary grooves 5, 6 which extend in the tire axial direction D1 are referred to as width grooves 5, 6; among ancillary grooves 5 through 9, note that those ancillary grooves 7 through 9 which extend in the tire circumferential direction D3 are referred to as circumferential grooves 7 through 9.

Width grooves 5, 6 extend so as to intersect the tire circumferential direction D3. In addition, among width grooves 5, 6, width grooves 5 for which the width dimension at tread surface 2a is not less than 1.6 mm are referred to as slits 5; among width grooves 5, 6, width grooves 6 for which the width dimension at tread surface 2a is less than 1.6 mm are referred to as sipes 6.

Slit 5 may, as is the case in the present embodiment, extend along the entire length in the tire axial direction D1 of second shoulder land 4b. Where this is the case, second shoulder land 4b will comprise a plurality of blocks 10 that are partitioned by slits 5. In addition, slits 5 may, as is the case in the present embodiment, extend in straight fashion; or, for example, a portion thereof may extend in such fashion as to have curved portion(s).

Sipe 6 may, as is the case in the present embodiment, extend along the entire length in the tire axial direction D1 of second shoulder land 4b. In addition, sipes 6 may, as is the case in the present embodiment, extend in straight fashion; or, for example, a portion thereof may extend in such fashion as to have curved portion(s).

Note that there is no particular limitation with respect to the number of sipes 6. For example, sipes 6 may be arranged such that there is one thereof per block 10, as is the case in the present embodiment. In addition, sipes 6 may be arranged centrally in the tire circumferential direction D3 of blocks 10, as is the case in the present embodiment.

Below, for convenience of description, one particular block 10 among blocks 10 will be referred to as first block 10a, and another block 10 thereamong which is adjacent to and toward the first circumferential direction side D31 of first block 10a will be referred to as second block 10b.

Furthermore, below, for convenience of description, that slit 5 which among slits 5 is contiguous with the end toward the first circumferential direction side D31 of first block 10a will be referred to as first slit 5a, and that slit 5 thereamong which is contiguous with the end toward the second circumferential direction side D32 of first block 10a will be referred to as second slit 5b. Accordingly, first slit 5a is that slit 5 which is arranged between first block 10a and second block 10b.

The plurality of circumferential grooves 7 through 9 are arranged in such fashion that at least portion(s) thereof appear to overlap as viewed in the tire axial direction D1. That is, the plurality of circumferential grooves 7 through 9 are respectively arranged so as to intersect the same tire meridional plane. As a result, the plurality of circumferential grooves 7 through 9 constitute circumferential groove group (s) 11. In addition, second shoulder land 4b comprises a plurality of circumferential groove groups 11, the plurality of circumferential groove groups 11 being arranged with prescribed spacing therebetween in the tire circumferential direction D3 (see FIG. 2). Note that there is no particular limitation with respect to the number of circumferential grooves 7 through 9 at circumferential groove groups 11.

Circumferential groove group 11 comprises first circumferential groove 7 which is arranged in inwardmost fashion in the tire axial direction D1, and second circumferential groove 8 which is arranged in outwardmost fashion in the tire axial direction D1. In addition, circumferential groove group 11 may, as is the case in the present embodiment, comprise third circumferential groove 9 which is arranged between first circumferential groove 7 and second circumferential groove 8 in the tire axial direction D1.

First through third circumferential grooves 7 through 9 are arrayed in the tire axial direction D1. In addition, first through third circumferential grooves 7 through 9 may, as is the case in the present embodiment, be arranged so as to be parallel to the tire circumferential direction D3. Furthermore, first through third circumferential grooves 7 through 9 may, as is the case in the present embodiment, be arranged so as to be mutually parallel. Note that what is referred to as parallel includes not only situations in which these are perfectly parallel but also includes situations in which these are approximately parallel such that the angle (s) of intersection therebetween are 5° or less.

First through third circumferential grooves 7 through are respectively arranged at portion(s) in the tire circumferential direction D3 of second shoulder land 4b. In addition, while there is no particular limitation with respect thereto, it is preferred that length dimension W3 of second circumferential groove 8 be greater than length dimension W2 of first circumferential groove 7, as is the case in the present embodiment.

Note that length dimension W4 of third circumferential groove 9 may, as is the case in the present embodiment, be greater than length dimension W2 of first circumferential groove 7. Furthermore, length dimension W3 of second circumferential groove 8 may be the same as length dimension W4 of third circumferential groove 9 as is the case in the present embodiment, or it may for example be greater than length dimension W4 of third circumferential groove 9.

First end 7a toward the first circumferential direction side D31 of first circumferential groove 7 may, as is the case in the present embodiment, be arranged in first block 10a and be separated from first slit 5a. Furthermore, second end 7b toward the second circumferential direction side D32 of first circumferential groove 7 may, as is the case in the present embodiment, be arranged in first block 10a and be separated from second slit 5b.

Where this is the case, first circumferential groove 7 will be arranged such that the entire length thereof lies within first block 10a. Note that first circumferential groove 7 may, as is the case in the present embodiment, intersect sipe 6 of first block 10a.

First end 8a toward the first circumferential direction side D31 of second circumferential groove 8 may, as is the case in the present embodiment, be arranged in second block 10b and be separated from first slit 5a. Furthermore, second end 8b toward the second circumferential direction side D32 of second circumferential groove 8 may, as is the case in the present embodiment, be arranged in first block 10a and be separated from second slit 5b.

Where this is the case, second circumferential groove 8 will be arranged such that it lies within both first block 10a and second block 10b. In addition, second circumferential groove 8 intersects first slit 5a. Note that second circumferential groove 8 may, as is the case in the present embodiment, intersect sipe 6 of first block 10a.

First end 9a toward the first circumferential direction side D31 of third circumferential groove 9 may, as is the case in the present embodiment, be arranged in second block 10b and be separated from first slit 5a. Furthermore, second end 9b toward the second circumferential direction side D32 of third circumferential groove 9 may, as is the case in the present embodiment, be arranged in first block 10a and be separated from second slit 5b.

Where this is the case, third circumferential groove 9 will be arranged such that it lies within both first block 10a and second block 10b. In addition, third circumferential groove 9 intersects first slit 5a. Note that third circumferential groove 9 may, as is the case in the present embodiment, intersect sipe 6 of first block 10a.

Thus, first through third circumferential grooves 7 through 9 may, as is the case in the present embodiment, be arranged so as to be separated from at least one of first slit 5a and second slit 5b. More specifically, in accordance with the present embodiment, first circumferential groove 7 is separated from first and second slits 5a, 5b; and second and third circumferential grooves 8, 9 are separated from second slit 5b. As a result, first block 10a is not completely subdivided in the tire axial direction D1 by any of first through third circumferential grooves 7 through 9.

It so happens that second circumferential groove 8 may, as is the case in the present embodiment, be arranged toward the exterior in the tire axial direction D1 from contact patch end 2e. As a result, e.g., in a situation where second circumferential groove 8 would not make contact with the ground when the vehicle is driving straight ahead, second circumferential groove 8 may be made capable of coming into contact with the ground when tire 1 is at an outside wheel when the vehicle is making a turn.

While there is no particular limitation with respect thereto, so that second circumferential groove 8 might definitively be made to come in contact with the ground when tire 1 is at an outside wheel when the vehicle is making a turn, note that it is preferred that second circumferential groove 8 be arranged within a region 4f that is not greater than prescribed distance W5 from contact patch end 2e. Note that said prescribed distance W5 might for example be a distance which is 4% to 6% of the distance W1 (see FIG. 2) between contact patch ends 2d, 2e, and in the present embodiment is a distance which is 5% of the distance W1 between contact patch ends 2d, 2e. Furthermore, said region 4f is also referred to as turning contact patch region 4f, and outer end 2f in the tire axial direction D1 of said region 4f is also referred to as turning contact patch end 2f.

Furthermore, as is the case in the present embodiment, width dimension W6 of that portion (hereinafter also referred to as "inside adjacent portion") 4g of second shoulder land 4b which is adjacent to the inside in the tire axial direction D1 of first circumferential groove 7 may be greater than width dimension W7 of that portion (hereinafter also referred to as "outside adjacent portion") 4h thereof which is adjacent to the outside in the tire axial direction D1 of first circumferential groove 7. Width dimension W6 of inside adjacent portion 4g might for example be a distance which is 5% to 8% of distance W1 between contact patch ends 2d, 2e, and/or might for example be 9 mm to 14 mm.

Moreover, inside adjacent portion 4g is the region between first circumferential groove 7 and second shoulder main groove 3b; i.e., the main groove 3b which is adjacent to and toward the interior in the tire axial direction D1 from first circumferential groove 7. Furthermore, outside adjacent portion 4h is the region between first circumferential groove 7 and third circumferential groove 9; i.e., the circumferential groove 9 which is adjacent to and toward the exterior in the tire axial direction D1 from first circumferential groove 7.

Figure 4:
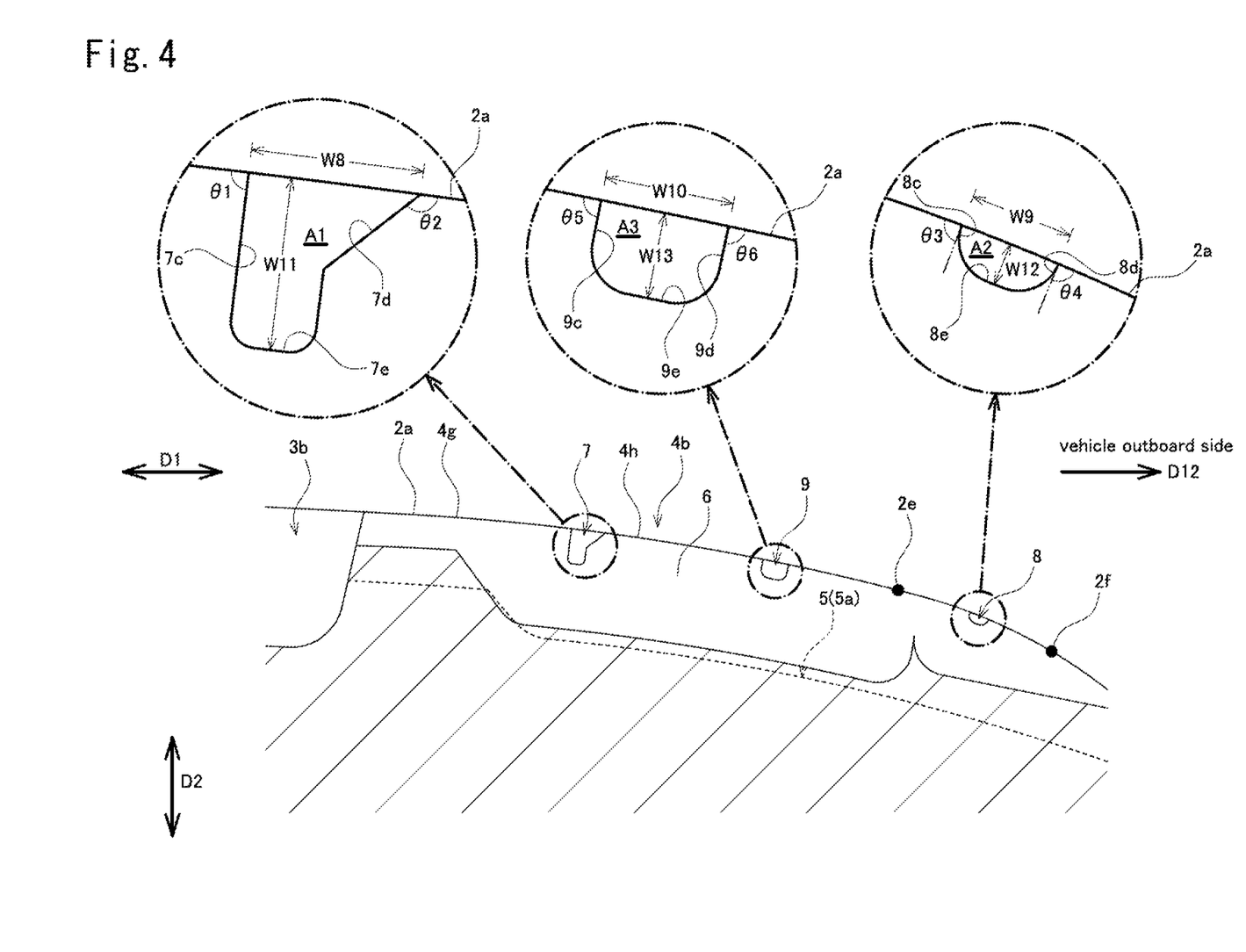
FIG. 4 is an enlarged view of a section taken along IV-IV in FIG. 3.

While there is no particular limitation with respect thereto, as shown in FIG. 4, it is preferred that width dimension W8 of first circumferential groove 7 be greater than width dimension W9 of second circumferential groove, as is the case in the present embodiment. Furthermore, width dimension W8 of first circumferential groove 7 may be greater than width dimension W10 of third circumferential groove 9 as is the case in the present embodiment, and/or width dimension W10 of third circumferential groove 9 may be greater than width dimension W9 of second circumferential groove 8 as is the case in the present embodiment.

While there is no particular limitation with respect thereto, it is preferred that width dimension W8, W10, W9 thus be greater the more toward the interior in the tire axial direction D1 that circumferential groove 7, 9, 8 is arranged. Note that width dimensions W8 through W10 of first through third circumferential grooves 7 through 9 are the width dimensions at tread surface 2a of circumferential grooves 7 through 9.

Moreover, width dimensions W8 through W10 of first through third circumferential grooves 7 through 9 may, as is the case in the present embodiment, be less than width dimension(s) of main groove(s) 3. Furthermore, width dimensions W8 through W10 of first through third circumferential grooves 7 through 9 may, as is the case in the present embodiment, be less than width dimension(s) of slit(s) 5. Furthermore, width dimensions W8 through W10 of first through third circumferential grooves 7 through 9 may, as is the case in the present embodiment, be greater than width dimension(s) of sipe(s) 6.

Furthermore, while there is no particular limitation with respect thereto, it is preferred that depth dimension W11 of first circumferential groove 7 be greater than depth dimension W12 of second circumferential groove 8, as is the case in the present embodiment. Furthermore, depth dimension W11 of first circumferential groove 7 may be greater than depth dimension W13 of third circumferential groove 9 as is the case in the present embodiment, and/or depth dimension W13 of third circumferential groove 9 may be greater than depth dimension W12 of second circumferential groove 8 as is the case in the present embodiment.

While there is no particular limitation with respect thereto, it is thus preferred that depth dimension W11, W13, W12 be greater the more toward the interior in the tire axial direction D1 that circumferential groove 7, 9, 8 is arranged. Note that depth dimensions W11 through W13 of first through third circumferential grooves 7 through 9 are the maximum depth dimensions of circumferential grooves 7 through 9 in direction(s) normal to tread surface 2a.

Moreover, depth dimensions W11 through W13 of first through third circumferential grooves 7 through 9 may, as is the case in the present embodiment, be less than depth dimension(s) of main groove(s) 3. Furthermore, depth dimensions W11 through W13 of first through third circumferential grooves 7 through 9 may, as is the case in the present embodiment, be less than depth dimension(s) of slit(s) 5. Furthermore, depth dimensions W11 through W13 of first through third circumferential grooves 7 through 9 may, as is the case in the present embodiment, be less than depth dimension(s) of sipe(s) 6.

In addition, as viewed in a tire meridional section, inner space area A1 of first circumferential groove 7 is greater than inner space area A2 of second circumferential groove 8. Furthermore, as viewed in a tire meridional section, inner space area A1 of first circumferential groove 7 may be greater than inner space area A3 of third circumferential groove 9 as is the case in the present embodiment, and/or inner space area A3 of third circumferential groove 9 may be greater than inner space area A2 of second circumferential groove 8 as is the case in the present embodiment.

While there is no particular limitation with respect thereto, as viewed in a tire meridional section, it is thus preferred that inner space area A1, A3, A2 be greater the more toward the interior in the tire axial direction D1 that circumferential groove 7, 9, 8 is arranged. Note that the inner spaces of first through third circumferential grooves 7 through 9 are the inner spaces constituted by first through third circumferential grooves 7 through 9 and tread surface 2a (imaginary surfaces at locations of circumferential grooves 7 through 9).

First circumferential groove 7 comprises pair of first side faces 7c, 7d which extend toward the interior in the tire radial direction D2 from tread surface 2a, and first bottom 7e which is arranged at the inner end in the tire radial direction D2 thereof. That first side face 7c which of the pair of first side faces 7c, 7d is arranged toward the interior in the tire axial direction D1 is referred to as first inner side face 7c; that first side face 7d which of the pair of first side faces 7c, 7d is arranged toward the exterior in the tire axial direction D1 is referred to as first outer side face 7d.

Second circumferential groove 8 comprises pair of second side faces 8c, 8d which extend toward the interior in the tire radial direction D2 from tread surface 2a, and second bottom 8e which is arranged at the inner end in the tire radial direction D2 thereof. That second side face 8c which of the pair of second side faces 8c, 8d is arranged toward the interior in the tire axial direction D1 is referred to as second inner side face 8c; that second side face 8d which of the pair of second side faces 8c, 8d is arranged toward the exterior in the tire axial direction D1 is referred to as second outer side face 8d.

Third circumferential groove 9 comprises pair of third side faces 9c, 9d which extend toward the interior in the tire radial direction D2 from tread surface 2a, and third bottom 9e which is arranged at the inner end in the tire radial direction D2 thereof. That third side face 9c which of the pair of third side faces 9c, 9d is arranged toward the interior in the tire axial direction D1 is referred to as third inner side face 9c; that third side face 9d which of the pair of third side faces 9c, 9d is arranged toward the exterior in the tire axial direction D1 is referred to as third outer side face 9d.

In addition, while there is no particular limitation with respect thereto, it is preferred that intersection angle $\theta 2$ between first outer side face 7d and tread surface 2a be greater than intersection angle $\theta 4$ between second outer side face 8d and tread surface 2a, as is the case in the present embodiment. Furthermore, while there is no particular limitation with respect thereto, it is preferred that intersection angle $\theta 2$ between first outer side face 7d and tread surface 2a be greater than intersection angle $\theta 1$ between first inner side face 7c and tread surface 2a, as is the case in the present embodiment. While there is no particular limitation with respect thereto, it is preferred, for example, that intersection angle $\theta 2$ between first outer side face 7d and tread surface 2a be an obtuse angle.

Intersection angle $\theta 2$ between first outer side face 7d and tread surface 2a may, as is the case in the present embodiment, be greater than intersection angle $\theta 6$ between third outer side face 9d and tread surface 2a. Furthermore, intersection angle $\theta 4$ between second outer side face 8d and tread surface 2a may, as is the case in the present embodiment, be the same as intersection angle $\theta 6$ between third outer side face 9d and tread surface 2a.

Intersection angle $\theta 1$ between first inner side face 7c and tread surface 2a may, as is the case in the present embodiment, be the same as intersection angle $\theta 3$ between second inner side face 8c and tread surface 2a. Furthermore, intersection angle $\theta 1$ between first inner side face 7c and tread surface 2a may, as is the case in the present embodiment, be the same as intersection angle $\theta 5$ between third inner side face 9c and tread surface 2a.

Where tread surface 2a is a curved surface, note that intersection angles $\theta 1$ through $\theta 6$ between respective side faces 7c, 7d, 8c, 8d, 9c, 9d and tread surface 2a are the intersection angles $\theta 1$ through $\theta 6$ between the respective side face 7c, 7d, 8c, 8d, 9c, 9d and an imaginary surface drawn parallel to the tangent of tread surface 2a at the location of the respective side face 7c, 7d, 8c, 8d, 9c, 9d.

Furthermore, where side faces 8c, 8d are curved surfaces, what is referred to as the intersection angles $\theta 3$, $\theta 4$ between said side faces 8c, 8d and tread surface 2a are the intersection angles $\theta 3$, $\theta 4$ between an imaginary surface drawn parallel to the tangent of the endpoint of said side face 8c, 8d (the location of tread surface 2a) and tread surface 2a. At FIG. 4 (and the same is true of FIG. 5), note that imaginary surfaces drawn parallel to the tangents of the endpoints (the locations of tread surface 2a) of second inner side face 8c and second outer side face 8d are shown in double-dash chain line.

Constitution of tire 1 associated with the present embodiment is as described above; action of tire 1 associated with the present embodiment is described below.

Firstly, because first through third circumferential grooves 7 through 9 are arrayed in the tire axial direction D1, when the vehicle makes a turn on a snowy road surface, there is action by edges at first through third circumferential grooves 7 through 9. For example, scraping of snow by edges at first through third circumferential grooves 7 through 9 makes it possible to suppress lateral sliding of tire 1.

What is more, because length dimensions W3, W4 of second and third circumferential grooves 8, 9 are greater than length dimension W2 of first circumferential groove 7, it is possible to ensure that there will be adequate length of second and third circumferential grooves 8, 9 at those portion(s) of second shoulder land 4b which are outer region(s) in the tire axial direction D1. This will make it possible to increase the magnitude of the force with which the edges of first through third circumferential grooves 7 through 9 act when the vehicle makes a turn on a snowy road surface.

Moreover, because second shoulder land 4b is arranged toward the vehicle outboard side D12, it will be possible to effectively increase the magnitude of the force with which the edges of first through third circumferential grooves 7 through 9 act when said tire 1 is at an outside wheel when the vehicle is making a turn on a snowy road surface. It is thus possible to improve performance with respect to stability in handling during turns on snowy road surfaces.

However, because second shoulder land 4b comprises first through third circumferential grooves 7 through 9, there is a possibility that rigidity of second shoulder land 4b might be reduced and that this could cause reduction in performance with respect to stability in handling during turns on dry road surfaces. To address this, first through third circumferential grooves 7 through 9 are arranged at portion(s) in the tire circumferential direction D3 of second shoulder land 4b. As a result, this makes it possible to suppress reduction in rigidity at second shoulder land 4b.

What is more, because first through third circumferential grooves 7 through 9 are separated from at least one of slits 5, 5 which are adjacent in the tire circumferential direction D3, block 10 of second shoulder land 4b is not completely subdivided in the tire axial direction D1 by any of first through third circumferential grooves 7 through 9. As a result, this makes it possible to suppress reduction in rigidity at second shoulder land 4b. Accordingly, it is possible to suppress reduction in performance with respect to stability in handling during turns on dry road surfaces.

Furthermore, because when the vehicle makes a turn on a dry road surface those portion(s) of lands 4a through 4d which are inner region(s) in the tire axial direction D1 do not tend to come in contact with the ground, there is a possibility that this could cause reduction in performance with respect to stability in handling during turns on dry road surfaces. To address this, width dimension W8 of first circumferential groove 7 is greater than width dimensions W9, W10 of second and third circumferential grooves 8, 9, and depth dimension W11 of first circumferential groove 7 is greater than depth dimensions W12, W13 of second and third circumferential grooves 8, 9.

In addition, as viewed in a tire meridional section, inner space area A1 of first circumferential groove 7 is greater than inner space areas A2, A3 of second and third circumferential grooves 8, 9. Accordingly, because it is possible to reduce the rigidity of inner region(s) of second shoulder land 4b, it will be possible to increase contact patch area at inner region(s) of second shoulder land 4b when the vehicle makes a turn on a dry road surface.

What is more, intersection angle θ2 between first outer side face 7d of first circumferential groove 7 and tread surface 2a is greater than intersection angles θ4, θ6 between second and third outer side face 8d, 9d of second and third circumferential grooves 8, 9 and tread surface 2a. This makes it possible to suppress excessive reduction in rigidity at outside adjacent portion 4h.

Accordingly, it will be possible to increase contact patch area at inside adjacent portion 4g when the vehicle makes a turn on a dry road surface and it will be possible at the same time to suppress occurrence of excessive deformation at outside adjacent portion 4h. As a result, it will be possible to improve performance with respect to stability in handling during turns on dry road surfaces.

It is thus possible to simultaneously achieve performance with respect to stability in handling during turns on dry road surfaces and performance with respect to stability in handling during turns on snowy road surfaces. Note that the respective dimensions, positional relationships, relative magnitudes, and so forth should be understood to be as measured under normal conditions when tire 1 mounted on a normal rim 20 and inflated to normal internal pressure is under no load.

As described above, the pneumatic tire 1 of the embodiment comprises a tread 2 having a tread surface 2a that comes in contact with a ground;
  wherein the tread 2 comprises a plurality of main grooves 3a through 3d extending along a full circumference in a tire circumferential direction D3, and a plurality of lands 4a through 4e partitioned by the main grooves 3a through 3d;
  the plurality of lands 4a through 4e include a first land (second shoulder land in the embodiment) 4b;
  the first land 4b comprises a plurality of circumferential grooves 7 through 9 that extend in the tire circumferential direction D3 and that are arrayed in a tire axial direction D1;
  the plurality of circumferential grooves 7 through 9 are respectively arranged at portions in the tire circumferential direction D3 of the first land 4b;
  the plurality of circumferential grooves 7 through 9 include a first circumferential groove 7 which is arranged in inwardmost fashion in the tire axial direction D1, and a second circumferential groove 8 which is arranged in outwardmost fashion in the tire axial direction D1; and
  as viewed in a tire meridional section, an inner space area A1 of the first circumferential groove 7 is greater than an inner space A2 area of the second circumferential groove 8.

In accordance with such constitution, because a plurality of circumferential grooves 7 through 9 are arrayed in the tire axial direction D1, it is possible to improve performance with respect to stability in handling during turns on snowy road surfaces. In addition, to address the fact that there is a tendency for those portion(s) of first land 4b which are inner region(s) in the tire axial direction D1 to not come in contact with the ground during a turn on a dry road surface, inner space area A1 of first circumferential groove 7 is greater than inner space area A2 of second circumferential groove 8 as viewed in a tire meridional section.

Because this makes it possible to reduce rigidity at inner region(s) of first land 4b, it is possible to increase contact patch area at inner region(s) of first land 4b during turns on dry road surfaces. Accordingly, because it is possible to improve performance with respect to stability in handling during turns on dry road surfaces, it is possible to simultaneously achieve performance with respect to stability in handling during turns on dry road surfaces and performance with respect to stability in handling during turns on snowy road surfaces.

Further, as in the present embodiment, it is preferred that the pneumatic tire 1 may include a configuration in which:
  a width dimension W8 of the first circumferential groove 7 is greater than a width dimension W9 of the second circumferential groove 8.

In accordance with such constitution, because width dimension W8 of first circumferential groove 7 is greater than width dimension W9 of second circumferential groove 8, it is possible to reduce rigidity at inner region(s) of first land 4b. This will make it possible to increase contact patch area at inner region(s) of first land 4b during turns on dry road surfaces.

Further, as in the present embodiment, it is preferred that the pneumatic tire 1 may include a configuration in which:
  the first circumferential groove 7 comprises a pair of first side faces 7c, 7d which extend toward an interior in a tire radial direction D2 from the tread surface 2a;

the second circumferential groove 8 comprises a pair of second side faces 8c, 8d which extend toward the interior in the tire radial direction D2 from the tread surface 2a;

the pair of first side faces 7c, 7d include a first outer side face 7c which is arranged toward an exterior in the tire axial direction D1, and a first inner side face 7d which is arranged toward an interior in the tire axial direction D1;

the pair of second side faces 8c, 8d include a second outer side face 8d which is arranged toward the exterior in the tire axial direction D1, and a second inner side face 8c which is arranged toward the interior in the tire axial direction D1; and an angle θ2 of intersection between the first outer side face 7d and the tread surface 2a is greater than an angle θ4 of intersection between the second outer side face 8d and the tread surface 2a.

In accordance with such constitution, it will be possible suppress excessive decrease in rigidity at portion 4h which is adjacent to the outside in the tire axial direction D1 of first circumferential groove 7. This will make it possible during turns on dry road surfaces to increase contact patch area at portion 4g which is adjacent to the inside in the tire axial direction D1 of first circumferential groove 7 and to at the same time suppress occurrence of excessive deformation at portion 4h which is adjacent to the outside in the tire axial direction D1 of first circumferential groove 7.

Further, as in the present embodiment, it is preferred that the pneumatic tire 1 may include a configuration in which:

a depth dimension W11 of the first circumferential groove 7 is greater than a depth dimension W12 of the second circumferential groove 8.

In accordance with such constitution, because depth dimension W11 of first circumferential groove 7 is greater than depth dimension W12 of second circumferential groove 8, it is possible to reduce rigidity at inner region(s) of first land 4b. This will make it possible to increase contact patch area at inner region(s) of first land 4b during turns on dry road surfaces.

Further, as in the present embodiment, it is preferred that the pneumatic tire 1 may include a configuration in which:

a length dimension W3 of the second circumferential groove 8 is greater than a length dimension W2 of the first circumferential groove 7.

In accordance with such constitution, because length dimension W3 of second circumferential groove 8 is greater than length dimension W2 of first circumferential groove 7, it is possible to ensure that there will be adequate length of circumferential groove 8 at those portion(s) of first land 4b which are outer region(s) in the tire axial direction D1. This will make it possible to increase the magnitude of the force with which the edges of circumferential grooves 7, 8 act during turns on snowy road surfaces.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that intersection angle θ1 between first inner side face 7c of first circumferential groove 7 and tread surface 2a is the same as intersection angle θ3 between second inner side face 8c of second circumferential groove 8 and tread surface 2a. However, pneumatic tire 1 is not limited to such constitution.

Figure 5:
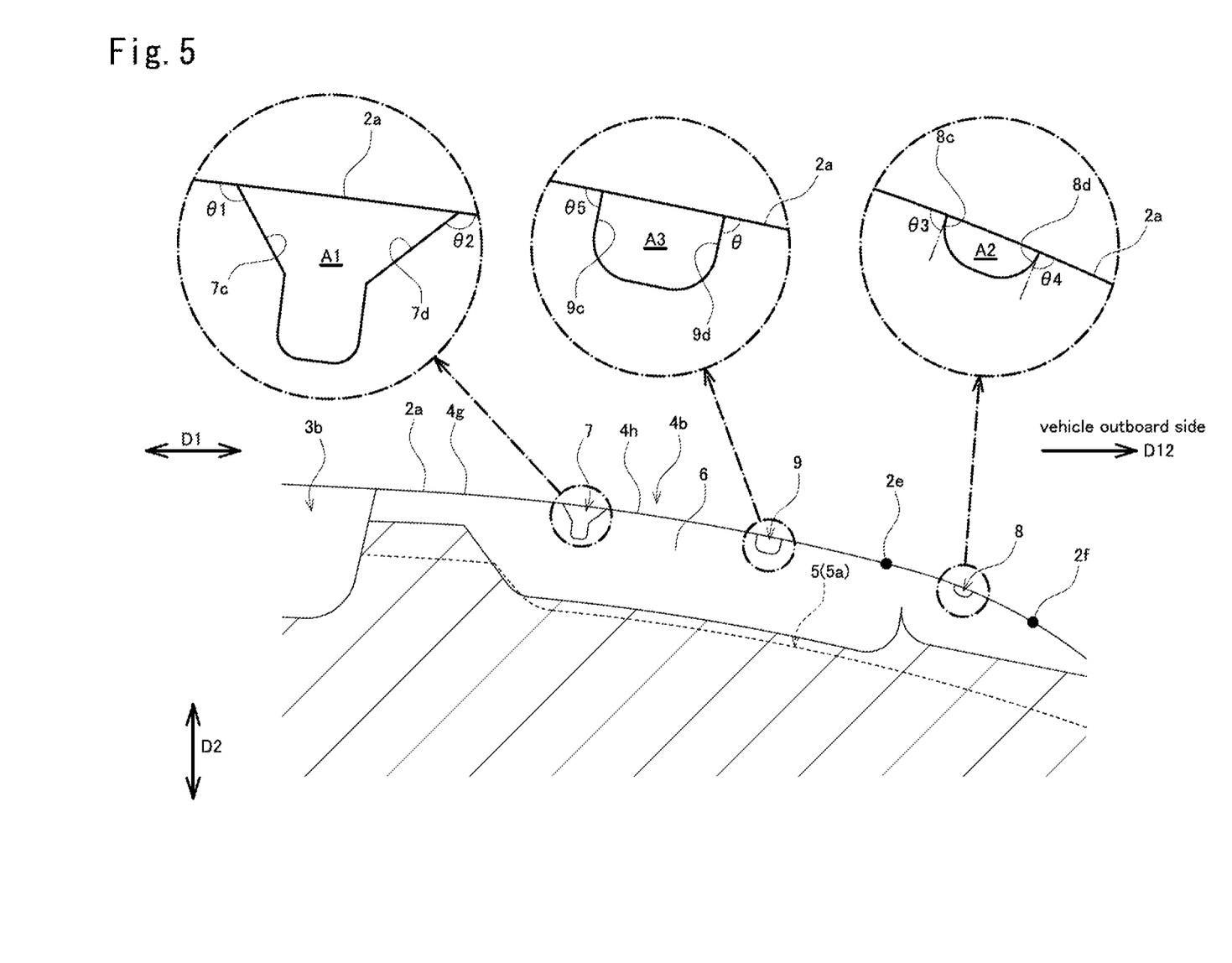
FIG. 5 is a view of section at same location as at FIG. 4 but of a pneumatic tire associated with another embodiment.

For example, as shown in FIG. 5, it is also possible to adopt a constitution in which intersection angle θ1 between first inner side face 7c and tread surface 2a is greater than intersection angle θ3 between second inner side face 8c and tread surface 2a. In accordance with such constitution, because it is possible to suppress excessive reduction in rigidity at portion 4g which is adjacent to the inside in the tire axial direction D1 of first circumferential groove 7, it is possible to suppress occurrence of excessive deformation at portion 4g which is adjacent to the inside of first circumferential groove 7 during turns on dry road surfaces.

At the pneumatic tire 1 associated with FIG. 5, while there is no particular limitation with respect thereto, it is preferred that intersection angle θ1 between first inner side face 7c and tread surface 2a be an obtuse angle. In addition, as shown in FIG. 5, intersection angle θ1 between first inner side face 7c and tread surface 2a may be less than intersection angle θ2 between first outer side face 7d and tread surface 2a. Moreover, intersection angle θ1 between first inner side face 7c and tread surface 2a might, for example, be greater than intersection angle θ2 between first outer side face 7d and tread surface 2a.

(2) The constitution of pneumatic tire 1 associated with the foregoing embodiment is such that circumferential grooves 7 through 9 are provided at second shoulder land 4b. However, pneumatic tire 1 is not limited to such constitution. For example, it is also possible to adopt a constitution in which circumferential grooves 7 through 9 are provided at at least one land among the plurality of lands 4a through 4e. That is, there is no particular limitation with respect to the number and location of land(s) 4a through 4e that are provided with circumferential grooves 7 through 9.

(2-1) While there is no particular limitation with respect thereto, so that the functionality of circumferential groove 7 through 9 might be more effectively made manifest during turns the more toward the exterior in the tire axial direction D1 that circumferential groove 7 through 9 is arranged, note that it is for example preferred that circumferential grooves 7 through 9 be provided at at least one of first and second shoulder lands 4a, 4b.

(2-2) Furthermore, while there is no particular limitation with respect thereto, so that the functionality of circumferential groove 7 through 9 might be more effectively made manifest during turns the more toward the vehicle outboard side D12 that circumferential groove 7 through 9 is arranged, it is for example preferred that circumferential grooves 7 through 9 be provided at lands 4b, 4d, the entireties of which are arranged in such fashion as to be toward the vehicle outboard side D12 from tire equatorial plane S1. More specifically, it is preferred, for example, that circumferential grooves 7 through 9 be provided at at least one of second shoulder land 4b and second quarter land 4d.

(3) Furthermore, the constitution of pneumatic tire 1 associated with the foregoing embodiment is such that this is a tire for which a vehicle mounting direction is indicated. However, pneumatic tire 1 is not limited to such constitution. For example, it is also possible to adopt a constitution in which pneumatic tire 1 is a tire for which a vehicle mounting direction is not indicated. More specifically, the tread pattern may be a tread pattern that exhibits point symmetry about an arbitrary point on the tire equator, or may be a tread pattern that exhibits line symmetry about the tire equator.

The invention claimed is:

1. A pneumatic tire comprising
a tread having a tread surface that comes in contact with a ground;
wherein the tread comprises a plurality of main grooves extending along a full circumference in a tire circumferential direction, and a plurality of lands partitioned by the main grooves;
the plurality of lands include a first land;
the first land comprises a plurality of circumferential grooves that extend in the tire circumferential direction and that are arrayed in a tire axial direction;
the plurality of circumferential grooves are respectively arranged at portions in the tire circumferential direction of the first land;
the plurality of circumferential grooves include a first circumferential groove which is arranged in inwardmost fashion in the tire axial direction, and a second circumferential groove which is arranged in outwardmost fashion in the tire axial direction;
as viewed in a tire meridional section, an inner space area of the first circumferential groove is greater than an inner space area of the second circumferential groove,
wherein the plurality of circumferential grooves further comprise a third circumferential groove which is arranged between the first circumferential groove and the second circumferential groove in the tire axial direction,
as viewed in the tire meridional section, the inner space area of the first circumferential groove is greater than an inner space area of the third circumferential groove,
as viewed in the tire meridional section, the inner space area of the third circumferential groove is greater than the inner space area of the second circumferential groove,
a length dimension of the second circumferential groove is greater than a length dimension of the first circumferential groove; and
a length dimension of the third circumferential groove is greater than the length dimension of the first circumferential groove.

2. The pneumatic tire according to claim 1 wherein a width dimension of the first circumferential groove is greater than a width dimension of the second circumferential groove.

3. The pneumatic tire according to claim 2 wherein
the first circumferential groove comprises a pair of first side faces which extend toward an interior in a tire radial direction from the tread surface;
the second circumferential groove comprises a pair of second side faces which extend toward the interior in the tire radial direction from the tread surface;
the pair of first side faces include a first outer side face which is arranged toward an exterior in the tire axial direction, and a first inner side face which is arranged toward an interior in the tire axial direction;
the pair of second side faces include a second outer side face which is arranged toward the exterior in the tire axial direction, and a second inner side face which is arranged toward the interior in the tire axial direction; and
an angle of intersection between the first outer side face and the tread surface is greater than an angle of intersection between the second outer side face and the tread surface.

4. The pneumatic tire according to claim 3 wherein the angle of intersection between the first outer side face and the tread surface is greater than an angle of intersection between the first inner side face and the tread surface.

5. The pneumatic tire according to claim 3 wherein an angle of intersection between the first inner side face and the tread surface is greater than an angle of intersection between the second inner side face and the tread surface.

6. The pneumatic tire according to claim 1 wherein a depth dimension of the first circumferential groove is greater than a depth dimension of the second circumferential groove.

7. The pneumatic tire according to claim 1 wherein a length dimension of the second circumferential groove is greater than a length dimension of the first circumferential groove.

8. The pneumatic tire according to claim 1 wherein
the first land is that which among the plurality of lands is arranged in outwardmost fashion in the tire axial direction;
the first circumferential groove is arranged toward an interior in the tire axial direction from a contact patch end; and
the second circumferential groove is arranged toward an exterior in the tire axial direction from the contact patch end.

9. A pneumatic tire comprising
a tread having a tread surface that comes in contact with a ground;
wherein the tread comprises a plurality of main grooves extending along a full circumference in a tire circumferential direction, and a plurality of lands partitioned by the main grooves;
the plurality of lands include a first land;
the first land comprises a plurality of circumferential grooves that extend in the tire circumferential direction and that are arrayed in a tire axial direction;
the plurality of circumferential grooves are respectively arranged at portions in the tire circumferential direction of the first land;
the plurality of circumferential grooves include a first circumferential groove which is arranged in inwardmost fashion in the tire axial direction, and a second circumferential groove which is arranged in outwardmost fashion in the tire axial direction;
as viewed in a tire meridional section, an inner space area of the first circumferential groove is greater than an inner space area of the second circumferential groove,
wherein the first land further comprises a plurality of slits which extend along the entire length in the tire axial direction of the first land, and a plurality of blocks which are partitioned by the plurality of slits;
the plurality of blocks include a first block, and a second block which is arranged toward a first side in the tire circumferential direction of the first block;
the plurality of slits include a first slit which is arranged between the first block and the second block, and a second slit which is contiguous with a second side in the tire circumferential direction of the first block;
a first end at the first side in the tire circumferential direction of the first circumferential groove is arranged toward the second side in the tire circumferential direction from the first slit;
a second end at the second side in the tire circumferential direction of the first circumferential groove is arranged toward the first side in the tire circumferential direction from the second slit;
a first end at the first side in the tire circumferential direction of the second circumferential groove is arranged toward the first side in the tire circumferential direction from the first slit; and a second end at the second side in the tire circumferential direction of the second circumferential groove is arranged toward the first side in the tire circumferential direction from the second slit.

10. The pneumatic tire according to claim 9 wherein the plurality of circumferential grooves further comprise a third circumferential groove which is arranged between the first circumferential groove and the second circumferential groove in the tire axial direction;

as viewed in the tire meridional section, the inner space area of the first circumferential groove is greater than an inner space area of the third circumferential groove; and as viewed in the tire meridional section, the inner space area of the third circumferential groove is greater than the inner space area of the second circumferential groove.

11. The pneumatic tire according to claim 10 wherein a width dimension of the first circumferential groove is greater than a width dimension of the third circumferential groove; and the width dimension of the third circumferential groove is greater than a width dimension of the second circumferential groove.

12. The pneumatic tire according to claim 11 wherein the first circumferential groove comprises a pair of first side faces which extend toward an interior in a tire radial direction from the tread surface;

the second circumferential groove comprises a pair of second side faces which extend toward the interior in the tire radial direction from the tread surface;

the third circumferential groove comprises a pair of third side faces which extend toward the interior in the tire radial direction from the tread surface;

the pair of first side faces include a first outer side face which is arranged toward an exterior in the tire axial direction, and a first inner side face which is arranged toward an interior in the tire axial direction;

the pair of second side faces include a second outer side face which is arranged toward the exterior in the tire axial direction, and a second inner side face which is arranged toward the interior in the tire axial direction;

the pair of third side faces include a third outer side face which is arranged toward the exterior in the tire axial direction, and a third inner side face which is arranged toward the interior in the tire axial direction;

an angle of intersection between the first outer side face and the tread surface is greater than an angle of intersection between the second outer side face and the tread surface; and the angle of intersection between the first outer side face and the tread surface is greater than an angle of intersection between the third outer side face and the tread surface.

13. The pneumatic tire according to claim 12 wherein the angle of intersection between the first outer side face and the tread surface is greater than an angle of intersection between the first inner side face and the tread surface.

14. The pneumatic tire according to claim 12 wherein an angle of intersection between the first inner side face and the tread surface is greater than an angle of intersection between the second inner side face and the tread surface; and the angle of intersection between the first inner side face and the tread surface is greater than an angle of intersection between the third inner side face and the tread surface.

15. The pneumatic tire according to claim 10 wherein a depth dimension of the first circumferential groove is greater than a depth dimension of the third circumferential groove; and the depth dimension of the third circumferential groove is greater than a depth dimension of the second circumferential groove.

16. The pneumatic tire according to claim 10 wherein a length dimension of the second circumferential groove is greater than a length dimension of the first circumferential groove; and a length dimension of the third circumferential groove is greater than the length dimension of the first circumferential groove.

17. The pneumatic tire according to claim 10 wherein the first land is that which among the plurality of lands is arranged in outwardmost fashion in the tire axial direction;

the first circumferential groove and the third circumferential groove are arranged toward an interior in the tire axial direction from a contact patch end; and the second circumferential groove is arranged toward an exterior in the tire axial direction from the contact patch end.

18. The pneumatic tire according to claim 9 wherein the first block comprises at least one sipe which extends so as to intersect the tire circumferential direction; and the at least one sipe respectively intersects the first circumferential groove and the second circumferential groove.

19. A pneumatic tire comprising
a tread having a tread surface that comes in contact with a ground;
wherein the tread comprises a plurality of main grooves extending along a full circumference in a tire circumferential direction, and a plurality of lands partitioned by the main grooves;
the plurality of lands include a first land;
the first land comprises a plurality of circumferential grooves that extend in the tire circumferential direction and that are arrayed in a tire axial direction;
the plurality of circumferential grooves are respectively arranged at portions in the tire circumferential direction of the first land;
the plurality of circumferential grooves include a first circumferential groove which is arranged in inwardmost fashion in the tire axial direction, and a second circumferential groove which is arranged in outwardmost fashion in the tire axial direction;
as viewed in a tire meridional section, an inner space area of the first circumferential groove is greater than an inner space area of the second circumferential groove;
wherein the plurality of circumferential grooves further comprise a third circumferential groove which is arranged between the first circumferential groove and the second circumferential groove in the tire axial direction;
as viewed in the tire meridional section, the inner space area of the first circumferential groove is greater than an inner space area of the third circumferential groove;

as viewed in the tire meridional section, the inner space area of the third circumferential groove is greater than the inner space area of the second circumferential groove;

the first land further comprises a plurality of slits which extend along the entire length in the tire axial direction of the first land, and a plurality of blocks which are partitioned by the plurality of slits;

the plurality of blocks include a first block, and a second block which is arranged toward a first side in the tire circumferential direction of the first block;

the plurality of slits include a first slit which is arranged between the first block and the second block, and a second slit which is contiguous with a second side in the tire circumferential direction of the first block;

a first end at the first side in the tire circumferential direction of the first circumferential groove is arranged toward the second side in the tire circumferential direction from the first slit;

a second end at the second side in the tire circumferential direction of the first circumferential groove is arranged toward the first side in the tire circumferential direction from the second slit;

a first end at the first side in the tire circumferential direction of the second circumferential groove is arranged toward the first side in the tire circumferential direction from the first slit;

a second end at the second side in the tire circumferential direction of the second circumferential groove is arranged toward the first side in the tire circumferential direction from the second slit;

a first end at the first side in the tire circumferential direction of the third circumferential groove is arranged toward the first side in the tire circumferential direction from the first slit; and a second end at the second side in the tire circumferential direction of the third circumferential groove is arranged toward the first side in the tire circumferential direction from the second slit.

20. The pneumatic tire according to claim 19 wherein the first block comprises at least one sipe which extends so as to intersect the tire circumferential direction; and the at least one sipe respectively intersects the first circumferential groove, the second circumferential groove, and the third circumferential groove.

* * * * *